United States Patent
Akiyama et al.

(10) Patent No.: US 10,236,530 B2
(45) Date of Patent: Mar. 19, 2019

(54) NONAQUEOUS ELECTROLYTE SECONDARY BATTERY AND METHOD OF MANUFACTURING NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Naohisa Akiyama, Nagoya (JP); Masanori Kitayoshi, Toyota (JP); Takashi Miura, Nisshin (JP); Yukiko Hori, Miyoshi (JP); Masashi Ueda, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 23 days.

(21) Appl. No.: 15/341,447

(22) Filed: Nov. 2, 2016

(65) Prior Publication Data

US 2017/0125840 A1    May 4, 2017

(30) Foreign Application Priority Data

Nov. 4, 2015  (JP) .................... 2015-216854

(51) Int. Cl.
| | |
|---|---|
| *H01M 2/00* | (2006.01) |
| *H01M 10/0525* | (2010.01) |
| *H01M 4/36* | (2006.01) |
| *H01M 4/505* | (2010.01) |
| *H01M 4/62* | (2006.01) |

(Continued)

(52) U.S. Cl.
CPC ....... *H01M 10/0525* (2013.01); *H01M 4/131* (2013.01); *H01M 4/1391* (2013.01); *H01M 4/366* (2013.01); *H01M 4/505* (2013.01); *H01M 4/623* (2013.01); *H01M 4/625* (2013.01); *H01M 4/628* (2013.01); *H01M 10/4235* (2013.01);

(Continued)

(58) Field of Classification Search
CPC ......... H01M 10/0525; H01M 10/4235; H01M 10/446; H01M 4/131; H01M 4/1391; H01M 4/366; H01M 4/505; H01M 4/623
See application file for complete search history.

(56) References Cited

U.S. PATENT DOCUMENTS

2015/0180036 A1    6/2015  Takebayashi

FOREIGN PATENT DOCUMENTS

| | | |
|---|---|---|
| CN | 104521035 A | 4/2015 |
| JP | 2014-103098 A | 6/2014 |
| WO | 2014/064513 A1 | 5/2014 |

OTHER PUBLICATIONS

Xie et al., "Characterization of a manganese dioxide/carbon nanotube composite fabricated using an in situ coating method," Elsevier; Carbon 45 (2007) pp. 2365-2373.

*Primary Examiner* — Jane J Rhee
(74) *Attorney, Agent, or Firm* — Sughrue Mion, PLLC (57) ABSTRACT

A method of manufacturing a nonaqueous electrolyte secondary battery includes: manufacturing a positive electrode sheet by forming a positive electrode active material layer, which includes trilithium phosphate, on a positive electrode current collector foil; accommodating the positive electrode sheet, a negative electrode sheet, and an electrolytic solution in a battery case; and charging a battery after the accommodation. During the manufacturing of the positive electrode sheet, a positive electrode active material is a composite oxide including at least lithium and manganese. During the manufacturing of the positive electrode sheet, a conductive additive is obtained by attaching at least one of (Continued)

manganese or manganese oxide to a surface of a carbon material.

19 Claims, 7 Drawing Sheets (51) Int. Cl.
    *H01M 10/44*     (2006.01)
    *H01M 4/131*     (2010.01)
    *H01M 4/1391*     (2010.01)
    *H01M 10/42*     (2006.01)
    *H01M 4/02*     (2006.01)

(52) U.S. Cl.
    CPC .... *H01M 10/446* (2013.01); *H01M 2004/028* (2013.01)

NONAQUEOUS ELECTROLYTE SECONDARY BATTERY AND METHOD OF MANUFACTURING NONAQUEOUS ELECTROLYTE SECONDARY BATTERY

CROSS REFERENCE TO RELATED APPLICATIONS

The disclosure of Japanese Patent Application No. 2015-216854, filed on Nov. 4, 2015, including the specification, drawings and abstract is incorporated herein by reference in its entirety.

BACKGROUND OF THE DISCLOSURE

1. Technical Field

The present disclosure relates to a nonaqueous electrolyte secondary battery and a method of manufacturing a nonaqueous electrolyte secondary battery.

2. Description of Related Art

When a lithium ion secondary battery is charged and discharged, oxidative decomposition of a nonaqueous electrolytic solution may occur. In a lithium ion secondary battery in which an acid is produced by the oxidative decomposition of a nonaqueous electrolytic solution, a transition metal may be eluted from a positive electrode active material due to the acid. In a case where a transition metal is eluted from a positive electrode active material, the capacity retention of a lithium ion secondary battery may decrease.

For example, Japanese Patent Application Publication No. 2014-103098 (JP 2014-103098 A) discloses a nonaqueous electrolyte secondary battery including a positive electrode active material layer that includes a positive electrode active material and trilithium phosphate as an additive. According to JP 2014-103098 A, by the positive electrode active material layer including trilithium phosphate, the elution of a transition metal from the positive electrode active material during the charging and discharging of the nonaqueous electrolyte secondary battery can be prevented. Specifically, trilithium phosphate can function as an acid consuming material by reacting with hydrofluoric acid (HF) produced in the nonaqueous electrolytic solution. As a result, the elution of a transition metal from the positive electrode active material can be prevented, and the durability of the nonaqueous electrolyte secondary battery can be improved.

SUMMARY OF THE DISCLOSURE

Here, in a case where a positive electrode active material layer includes trilithium phosphate, a film derived from trilithium phosphate is formed on a surface of a positive electrode active material in an initial charging step of a lithium ion secondary battery. On the surface of the positive electrode active material on which the film derived from trilithium phosphate is formed, the oxidative decomposition of a nonaqueous electrolytic solution is prevented. That is, by forming the film derived from trilithium phosphate on the surface of the positive electrode active material, the production of hydrofluoric acid on the surface of the positive electrode active material can be prevented.

In general, in order to improve the conductivity of a positive electrode active material layer, the positive electrode active material layer includes a conductive additive. It was found that, in a lithium ion secondary battery in which a positive electrode active material layer includes a conductive additive, the oxidative decomposition of a nonaqueous electrolytic solution may also occur on a surface of the conductive additive. Hydrofluoric acid is also produced due to the oxidative decomposition of the nonaqueous electrolytic solution on the surface of the conductive additive.

The present disclosure provides a nonaqueous electrolyte secondary battery and a method of manufacturing a nonaqueous electrolyte secondary battery, in which the oxidative decomposition of a nonaqueous electrolytic solution can be prevented.

According to a first aspect of the disclosure, there is provided a nonaqueous electrolyte secondary battery including: a positive electrode sheet including a positive electrode current collector foil and a positive electrode active material layer which includes a positive electrode active material and a conductive additive, in which the positive electrode active material has a composite oxide and a first film on a surface of the composite oxide, and the conductive additive has a carbon material and a second film on a surface of the carbon material, the composite oxide including lithium and manganese, the first film including fluorine, manganese, and phosphorus, the second film including fluorine, manganese, and phosphorus; a negative electrode sheet; a nonaqueous electrolytic solution that includes an ionic compound including fluorine; and a battery case that accommodates the positive electrode sheet, the negative electrode sheet, and the nonaqueous electrolytic solution.

According to the first aspect of the disclosure, the first film is formed on the positive electrode active material. Therefore, the oxidative decomposition of the nonaqueous electrolytic solution on the surface of the positive electrode active material is prevented. In addition, the second film is formed on the conductive additive. Therefore, the oxidative decomposition of the nonaqueous electrolytic solution on the surface of the conductive additive is prevented. As a result, in the nonaqueous electrolyte secondary battery according to the first aspect of the disclosure, the oxidative decomposition of the nonaqueous electrolytic solution is prevented.

According to a second aspect of the disclosure, there is provided a method of manufacturing a nonaqueous electrolyte secondary battery, the method including: manufacturing a positive electrode sheet by forming a positive electrode active material layer, which includes a positive electrode active material and a conductive additive, on a surface of a positive electrode current collector foil, the positive electrode active material being a composite oxide including lithium and manganese, and the conductive additive being obtained by attaching at least one of manganese and manganese oxide to a surface of a carbon material; accommodating the positive electrode sheet, a negative electrode sheet, a nonaqueous electrolytic solution that includes an ionic compound including fluorine, and trilithium phosphate in a battery case; and charging a battery after the positive electrode sheet, the negative electrode sheet, the nonaqueous electrolytic solution, and the trilithium phosphate are accommodated.

According to the second aspect of the disclosure, during the manufacturing of the positive electrode sheet, the positive electrode active material is a composite oxide including at least lithium and manganese. During the manufacturing of the positive electrode sheet, the conductive additive is obtained by attaching at least one of manganese or manganese oxide to a surface of a carbon material. When the battery is charged after the positive electrode sheet, the negative electrode sheet, the nonaqueous electrolytic solution, and the trilithium phosphate are accommodated, hydrofluoric acid is produced due to the oxidative decomposition of the nonaqueous electrolytic solution on the surface of the positive electrode active material and on the surface of the conductive additive. The hydrofluoric acid causes the dissolution of trilithium phosphate and the elution of manganese ions from the positive electrode active material. The manganese ions eluted from the positive electrode active material bind to the dissolved trilithium phosphate and are deposited on the surface of the positive electrode active material to form a film on the surface of the positive electrode active material. Further, the hydrofluoric acid causes the elution of manganese ions from at least one of manganese or manganese oxide attached to the surface of the conductive additive. The manganese ions eluted from at least one of manganese or manganese oxide of the conductive additive bind to the dissolved trilithium phosphate and are deposited on the surface of conductive additive to form a film on the surface of the conductive additive. Both the positive electrode active material on which the film is formed and the conductive additive on which the film is formed prevent the oxidative decomposition of the nonaqueous electrolytic solution on the surfaces thereof. That is, the oxidative decomposition of the nonaqueous electrolytic solution in the manufactured nonaqueous electrolyte secondary battery can be prevented.

In the method of manufacturing a nonaqueous electrolyte secondary battery described above, an atomic ratio of manganese to carbon in the conductive additive may be 0.05 or higher. The reason for this is that, with the above-described configuration, the film formed on the surface of the conductive additive can sufficiently prevent the oxidative decomposition of the nonaqueous electrolytic solution on the surface of the conductive additive.

In the method of manufacturing a nonaqueous electrolyte secondary battery described above, an atomic ratio of manganese to carbon in the conductive additive may be 0.10 or lower. The reason for this is as follows. In a case where the atomic ratio of manganese to carbon in the conductive additive is excessively high, manganese ions, which do not contribute to the formation of the film of the conductive additive among the manganese ions eluted from the surface of the conductive additive, may be deposited on the negative electrode sheet. The deposition of manganese on the negative electrode sheet may cause a decrease in the charge capacity of the nonaqueous electrolyte secondary battery. Accordingly, by using the conductive additive in which the atomic ratio of manganese to carbon is 0.10 or lower, the deposition of manganese on the negative electrode sheet is prevented, and a decrease in the charge capacity of the nonaqueous electrolyte secondary battery can be prevented.

According to the present disclosure, there are provided a nonaqueous electrolyte secondary battery and a method of manufacturing a nonaqueous electrolyte secondary battery, in which the oxidative decomposition of a nonaqueous electrolytic solution can be prevented.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described in detail with reference to the drawings.

Figure 1:
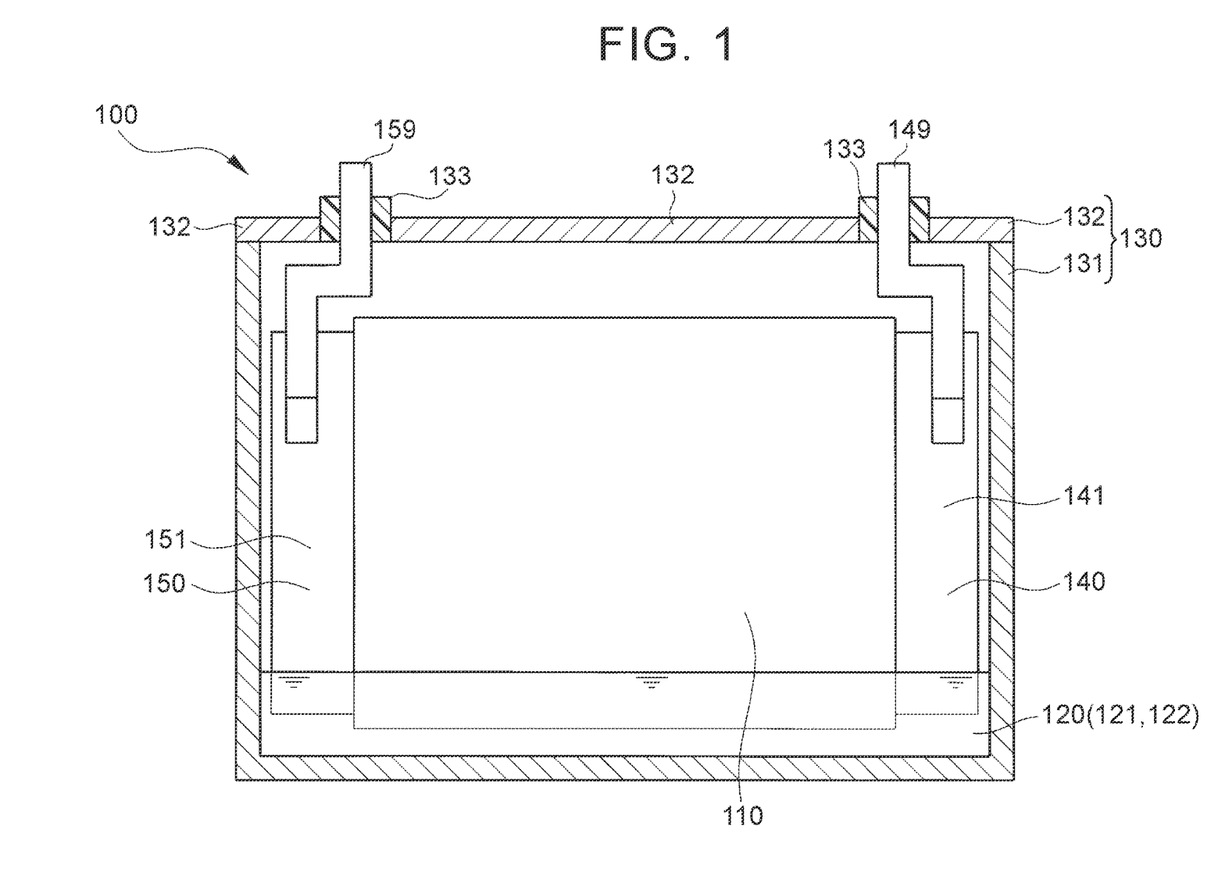
FIG. 1 is a sectional view showing a battery according to an embodiment of the disclosure.

First, a battery 100 (refer to FIG. 1) according to the embodiment will be described. FIG. 1 shows a sectional view showing the battery 100 according to the embodiment. As shown in FIG. 1, the battery 100 is a lithium ion secondary battery in which an electrode body 110 and an electrolytic solution 120 are accommodated in a battery case 130. The battery case 130 includes a case body 131 and a sealing plate 132. The sealing plate 132 includes an insulating member 133.

The electrolytic solution 120 according to the embodiment is a nonaqueous electrolytic solution in which an electrolyte 122 is dissolved in a nonaqueous solvent 121. Specifically, in the electrolytic solution 120 according to the embodiment, as the nonaqueous solvent 121, a mixed organic solvent is used in which ethylene carbonate (EC) and ethyl methyl carbonate (EMC) which are organic solvents are mixed with each other. As the electrolytic solution 120, for example, dimethyl carbonate (DMC) which is another organic solvent can be used.

In the electrolytic solution 120 according to the embodiment, as the electrolyte 122, lithium hexafluorophosphate ($LiPF_6$) which is an ionic compound including fluorine is used. That is, the electrolytic solution 120 is a nonaqueous electrolytic solution that includes an ionic compound including fluorine. As the electrolyte 122, for example, $LiPF_6$, $LiBF_4$, $LiAsF_6$, $LiCF_3SO_3$, $LiC_4F_9SO_3$, $LiN(CF_3SO_2)_2$, or $LiC(CF_3SO_2)_3$ can be used.

Figure 2:
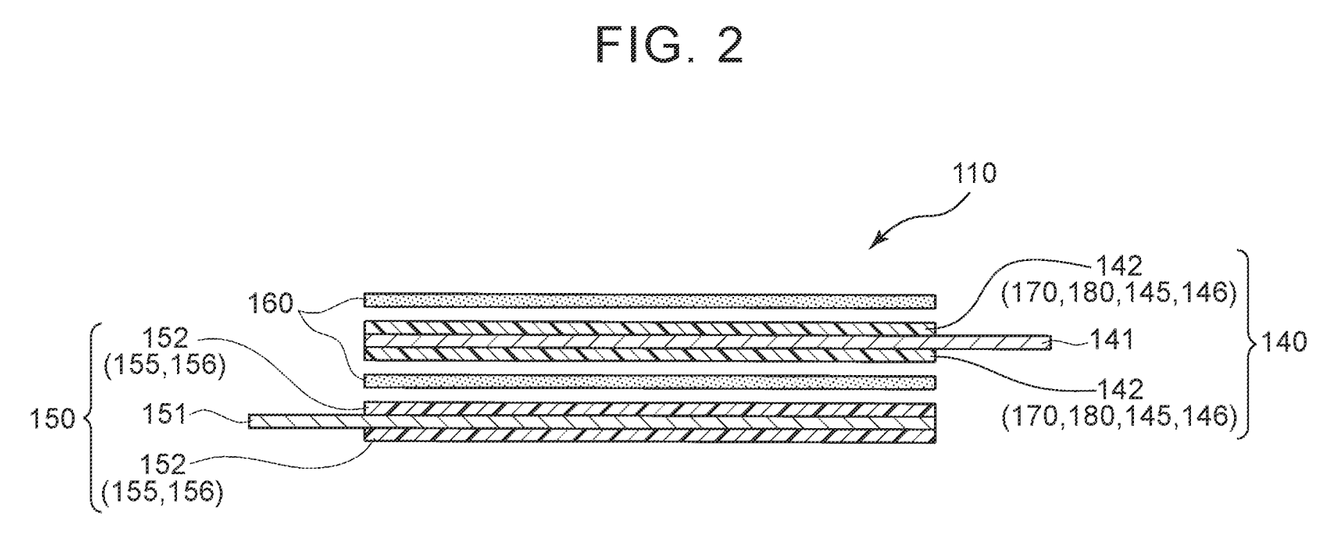
FIG. 2 is a sectional view showing a positive electrode sheet, a negative electrode sheet, and separators of the battery according to the embodiment.

FIG. 2 is a sectional view showing a positive electrode sheet 140, a negative electrode sheet 150, and separators 160 that constitute the electrode body 110. All of the positive electrode sheet 140, the negative electrode sheet 150, and the separators 160 have an elongated sheet shape in a depth direction of FIG. 2. The electrode body 110 is obtained by laminating the positive electrode sheet 140, the negative electrode sheet 150, and the separators 160 as shown in FIG. 2 and winding the obtained laminate in a flat shape in a winding axial direction which is a left-right direction in FIG. 2.

As shown in FIG. 2, in the positive electrode sheet 140, a positive electrode active material layer 142 is formed on both surfaces of a positive electrode current collector foil 141. As the positive electrode current collector foil 141, an aluminum foil can be used. The positive electrode active material layer 142 according to the embodiment includes a positive electrode active material 170, a conductive additive 180, a binder 145, and trilithium phosphate ($Li_3PO_4$) 146.

The positive electrode active material 170 is a material contributing to the charging and discharging of the battery 100 and can store and release lithium ions. The conductive additive 180 is a material which can improve the conductivity of the positive electrode active material layer 142. The binder 145 binds the materials, which are included in the positive electrode active material layer 142, to each other to form the positive electrode active material layer 142, and can also bind the positive electrode active material layer 142 to a surface of the positive electrode current collector foil 141. As the binder 145, for example, polyvinylidene fluoride (PVDF) can be used. The trilithium phosphate 146 is an additive capable of forming a protective film on a surface of the positive electrode active material 170 or the like.

Figure 3:
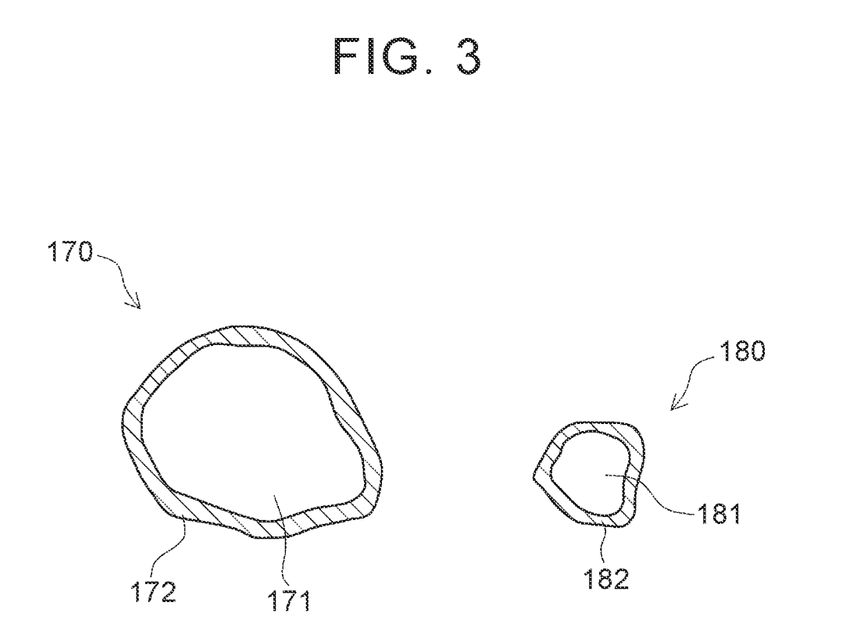
FIG. 3 is a sectional view showing a positive electrode active material and a conductive additive of the battery according to the embodiment.

FIG. 3 is a sectional view showing the positive electrode active material 170 and the conductive additive 180 of the battery 100 according to the embodiment. In the positive electrode active material 170, as shown in FIG. 3, a positive electrode active material film 172 is formed on a surface of a positive electrode active material base 171. As the positive electrode active material base 171, a composite oxide including at least lithium (Li) and manganese (Mn) can be used. In the embodiment, specifically, the positive electrode active material base 171 is obtained by substituting a part of manganese (Mn) in lithium manganese oxide ($LiMn_2O_4$) having a spinel-type crystal structure with a transition metal. That is, in the embodiment, $LiNi_{1/2}Mn_{3/2}O_4$ is used as the positive electrode active material 170. In $LiNi_{1/2}Mn_{3/2}O_4$, the upper limit of the action potential vs. lithium metal (Li) is 4.75 V.

The positive electrode active material film 172 includes at least fluorine (F), manganese (Mn), and phosphorus (P). The positive electrode active material film 172 is a film derived from the trilithium phosphate 146.

In the conductive additive 180, as shown in FIG. 3, a conductive additive film 182 is formed on a surface of a conductive additive base 181. In the embodiment, a carbon material is used as the conductive additive base 181. As the carbon material, for example, carbon black such as acetylene black (AB), Ketjen black, furnace black, or channel black can be used. In the embodiment, specifically, AB is used as the conductive additive base 181.

As in the case of the positive electrode active material film 172, the conductive additive film 182 includes at least fluorine (F), manganese (Mn), and phosphorus (P). As in the case of the positive electrode active material film 172, the conductive additive film 182 is a film derived from the trilithium phosphate 146. The positive electrode active material film 172 and the conductive additive film 182 will be described below in detail.

As shown in FIG. 2, in the negative electrode sheet 150, a negative electrode active material layer 152 is formed on both surfaces of a negative electrode current collector foil 151. As the negative electrode current collector foil 151, a copper foil can be used. The negative electrode active material layer 152 according to the embodiment includes a negative electrode active material 155 and a binder 156.

The negative electrode active material 155 is a material contributing to the charging and discharging of the battery 100 and can store and release lithium ions. As the negative electrode active material 155, for example, natural graphite can be used. The binder 156 binds the materials, which are included in the negative electrode active material layer 152, to each other to form the negative electrode active material layer 152, and can also bind the negative electrode active material layer 152 to a surface of the negative electrode current collector foil 151. As the binder 156, for example, styrene-butadiene rubber (SBR) can be used.

The separator 160 is a porous sheet having plural pores. As the separator 160, for example, polypropylene (PP) or polyethylene (PE) can be used alone, or a composite material in which plural materials among the above materials are laminated can be used.

As shown in FIG. 2, the positive electrode sheet 140 has a portion where the positive electrode current collector foil 141 is exposed without the positive electrode active material layer 142 being formed. The negative electrode sheet 150 has a portion where the negative electrode current collector foil 151 is exposed without the negative electrode active material layer 152 being formed. In the wound electrode body 110 shown in FIG. 1, a right end portion consists of only the exposure portion of the positive electrode sheet 140 where the positive electrode current collector foil 141 is exposed. In the wound electrode body 110 shown in FIG. 1, a left end portion consists of only the exposure portion of the negative electrode sheet 150 where the negative electrode current collector foil 151 is exposed.

Further, as shown in FIG. 1, a positive electrode terminal 149 is connected to the right end portion consisting of the exposure portion of the positive electrode current collector foil 141 of the electrode body 110. A negative electrode terminal 159 is connected to the left end portion consisting of the exposure portion of the negative electrode current collector foil 151 of the electrode body 110. Respective ends of the positive electrode terminal 149 and the negative electrode terminal 159 which are not connected to the electrode body 110 protrude to the outside of the battery case 130 through the insulating member 133.

On the other hand, at the center of the electrode body 110 in FIG. 1, a portion of the positive electrode sheet 140 where the positive electrode active material layer 142 is formed and a portion of the negative electrode sheet 150 where the negative electrode active material layer 152 is formed are laminated with the separators 160 interposed therebetween as shown in FIG. 2. The battery 100 is charged and discharged at the center of the electrode body 110 through the positive electrode terminal 149 and the negative electrode terminal 159.

Figure 4:
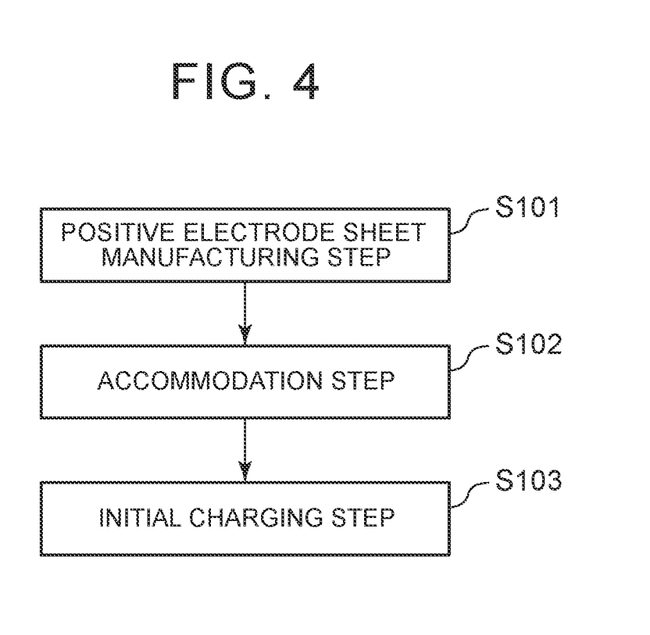
FIG. 4 is a diagram showing the manufacturing procedure of the battery according to the embodiment.

Next, a method of manufacturing the battery 100 according to the embodiment will be described. FIG. 4 shows the manufacturing procedure of the battery 100 according to the embodiment. As shown in FIG. 4, in the embodiment, the battery 100 is manufactured through a positive electrode sheet manufacturing step (S101), an accommodation step (S102), and an initial charging step (S103).

First, the positive electrode sheet manufacturing step (S101) will be described in detail. In this step, the positive electrode sheet 140 is prepared by forming the positive electrode active material layer 142 on a surface of the positive electrode current collector foil 141. In the embodiment, a positive electrode paste is used to form the positive electrode active material layer 142. The positive electrode paste is manufactured by dispersing the positive electrode active material 170, the conductive additive 180, the binder 145, and the trilithium phosphate 146, which are positive electrode materials constituting the positive electrode active material layer 142, in a solvent. As the solvent of the positive electrode paste, N-methylpyrrolidone (NMP) can be used. In the embodiment, the positive electrode paste is manufactured by putting the positive electrode materials and the solvent into a disperser and dispersing the components.

Figure 5:
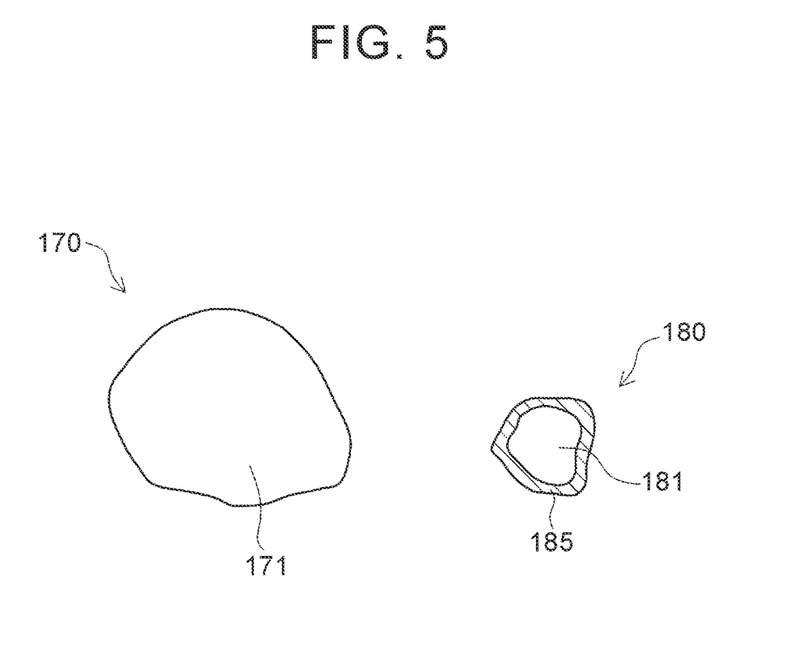
FIG. 5 is a sectional view showing a positive electrode active material and a conductive additive used in a positive electrode sheet manufacturing step according to the embodiment.

Here, during the manufacturing of the positive electrode paste in the positive electrode sheet manufacturing step according to the embodiment, the positive electrode active material film 172 is not formed on the positive electrode active material 170. Specifically, in the embodiment, as shown in FIG. 5, only the positive electrode active material base 171 is used as the positive electrode active material 170. That is, $LiNi_{1/2}Mn_{3/2}O_4$, which is a composite oxide including at least lithium and manganese, is put into the disperser for manufacturing the positive electrode paste.

Here, during the manufacturing of the positive electrode paste in the positive electrode sheet manufacturing step according to the embodiment, the conductive additive film 182 is not formed on the conductive additive 180. Further, during the manufacturing of the positive electrode paste, the conductive additive 180 is obtained by attaching at least one of manganese (Mn) or manganese oxide to a surface of the conductive additive base 181. Specifically, in the embodiment, as shown in FIG. 5, the conductive additive 180 is obtained by attaching manganese oxide 185 to a surface of the conductive additive base 181. The conductive additive 180 is manufactured by performing a conductive additive manufacturing step (FIG. 6) in advance before the positive electrode sheet manufacturing step.

Figure 6:
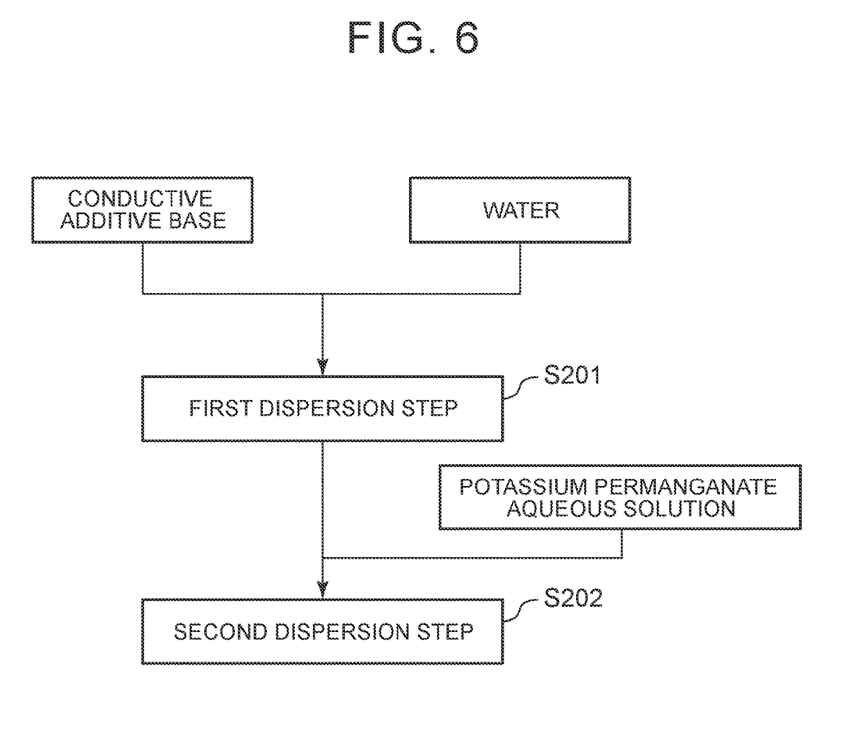
FIG. 6 is a diagram showing the manufacturing procedure of the conductive additive used in the positive electrode sheet manufacturing step according to the embodiment.

FIG. 6 shows the procedure of the conductive additive manufacturing step for preparing the conductive additive 180 used for the positive electrode paste. As shown in FIG. 6, in the conductive additive manufacturing step according to the embodiment, the conductive additive 180 used for the positive electrode paste is manufactured through a first dispersion step (S201) and a second dispersion step (S202).

First, in the first dispersion step (S201), the conductive additive base 181 and water are put into a disperser such that the conductive additive base 181 is dispersed in water. The conductive additive base 181 used herein is AB having a surface on which the manganese oxide 185 or the conductive additive film 182 is not attached.

Next, a potassium permanganate aqueous solution ($KMnO_4$) is put into the disperser, and the second dispersion step (S202) is performed. In the second dispersion step, manganese dioxide ($MnO_2$) is deposited on a surface of the conductive additive base 181 due to a reduction reaction in the potassium permanganate aqueous solution. In the embodiment, the first dispersion step and the second dispersion step are performed together with irradiation of ultrasonic waves. In the second dispersion step, the irradiation of ultrasonic waves accelerates the reduction reaction in the potassium permanganate aqueous solution, which accelerates the deposition of the manganese oxide 185 on the surface of the conductive additive base 181.

By removing a liquid component after the second dispersion step, the conductive additive 180 can be obtained in which manganese dioxide which is the manganese oxide 185 is attached to the surface of the conductive additive base 181. The liquid component can be removed by extracting the conductive additive 180, which is a solid component, after the second dispersion step and drying the extracted conductive additive 180. Accordingly, through the conductive additive manufacturing step shown in FIG. 6, the conductive additive 180 (FIG. 5) which is obtained by attaching the manganese oxide 185 to the surface of the conductive additive base 181 can be prepared.

The positive electrode paste can be manufactured by dispersing the positive electrode active material 170 and the conductive additive 180 together with the binder 145 and the trilithium phosphate 146 in the solvent. In the embodiment, the viscosity of the positive electrode paste is adjusted to 2.5 Pa·s or higher.

Further, the positive electrode active material layer 142 is formed by applying the prepared positive electrode paste to a region of the surface of the positive electrode current collector foil 141 where the positive electrode active material layer 142 is formed and drying the applied positive electrode paste. That is, by drying the positive electrode paste, the respective materials, such as the positive electrode active material 170, which are included in the positive electrode paste, bind to each other through the binder 145, thereby forming the positive electrode active material layer 142. Through the binder 145, the positive electrode active material layer 142 binds to the surface of the positive electrode current collector foil 141. As a result, the positive electrode sheet 140 is prepared.

Further, in the positive electrode sheet manufacturing step according to the embodiment, the positive electrode active material layer 142 formed on the surface of the positive electrode current collector foil 141 is pressed in a thickness direction thereof. For the pressing, a small roll pressing machine can be used. The pressing is performed to adjust the density of the positive electrode active material layer 142. In the embodiment, due to the pressing, the density of the positive electrode active material layer 142 is adjusted to a range of 2.2 $g/cm^3$ to 2.4 $g/cm^3$.

As shown in FIG. 4, the accommodation step (S102) is performed after the positive electrode sheet manufacturing step (S101). In the accommodation step, first, the electrode body 110 is prepared. Specifically, the electrode body 110 is prepared by laminating the positive electrode sheet 140, which is manufactured in the positive electrode sheet manufacturing step, and the negative electrode sheet 150 with the separators 160 interposed therebetween and winding the obtained laminate in a flat shape.

The negative electrode sheet 150 can be manufactured using a negative electrode paste which is formed of a material different from that of the positive electrode sheet 140. That is, the negative electrode paste can be prepared by dispersing the negative electrode active material 155 and the binder 156 in a solvent. In order to appropriately disperse the negative electrode active material 155 in the negative electrode paste, a dispersant may be added. The negative electrode active material layer 152 can be formed by applying the prepared negative electrode paste to the negative electrode current collector foil 151 and drying the applied negative electrode paste. As a result, the negative electrode sheet 150 can be prepared in which the negative electrode active material layer 152 is formed on a surface of the negative electrode current collector foil 151.

Next, the electrode body 110 is accommodated in the case body 131 through an opening. As a result, the positive electrode sheet 140 and the negative electrode sheet 150 are accommodated in the case body 131. By sealing the opening of the case body 131 with the sealing plate 132, the components are joined to each other. The positive electrode terminal 149 and the negative electrode terminal 159 may be connected to the electrode body 110 before accommodating the electrode body 110 in the case body 131. The joining of the battery case 130 or the joining of the positive electrode terminal 149 and the electrode body 110 or the joining of the negative electrode terminals 159 and the electrode body 110 can be performed by welding or the like.

The positive electrode active material layer 142 of the positive electrode sheet 140 includes the trilithium phosphate 146. That is, in the accommodation step according to the embodiment, the trilithium phosphate 146 is accommodated in the battery case 130 together with the positive electrode sheet 140.

Further, in the accommodation step, the electrolytic solution 120 is also accommodated in the battery case 130. The electrolytic solution 120 can be accommodated in the case body 131 through the opening, for example, before the joining of the battery case 130. Alternatively, a liquid injection hole may be provided to connect the inside and the outside of the battery case 130 to each other such that the electrolytic solution 120 can be injected into the battery case 130 through the liquid injection hole. After the injection of the electrolytic solution 120, the liquid injection hole may be sealed. Accordingly, in the accommodation step, the battery 100 can be constructed.

Next, as shown in FIG. 4, the initial charging step (S103) is performed. In this step, initial charging is performed in which the battery 100 constructed in the accommodation step is initially charged. In the initial charging step according to the embodiment, constant-current (CC) charging is performed until the charge capacity of the battery 100 is fully charged, and thus the stage-of-charge (SOC) is adjusted to 100%. In the embodiment, the battery 100 can be manufactured by performing the initial charging step.

Regarding the battery 100 which has undergone the accommodation step, appropriately, an aging treatment may be performed. In order to remove a defective product in the manufacturing steps, appropriately, an inspection step or the like may be performed.

Here, in the embodiment, as the positive electrode active material 170, $LiNi_{1/2}Mn_{3/2}O_4$ is used in which the upper limit of the action potential vs. lithium metal is high at 4.1 V or higher. Specifically, in $LiNi_{1/2}Mn_{3/2}O_4$ used in the embodiment, as described above, the upper limit of the action potential vs. lithium metal is 4.75 V. Therefore, in the initial charging step, the battery voltage of the battery 100 is 4.1 V to 4.75 V.

The solvent component in the electrolytic solution 120 according to the embodiment is likely to be oxidized and decomposed on the surface of the positive electrode active material 170 in the positive electrode active material layer 142 in which the potential is increased to be 4.1 V or higher. By the electrolytic solution 120 being oxidized and decomposed, hydrogen ions are produced. Further, the produced hydrogen ions react with fluorine ions in the electrolytic solution 120 to produce hydrofluoric acid (HF).

The conductive additive 180, which is present near the positive electrode active material 170 in the positive electrode active material layer 142, has the same potential as that of the positive electrode active material 170. Therefore, it is presumed that, on the surface of the conductive additive 180, the oxidative decomposition of the solvent component of the electrolytic solution 120 occurs due to the positive electrode potential. That is, in the initial charging step, hydrofluoric acid is produced near the surface of the positive electrode active material 170 and the surface of the conductive additive 180 in the positive electrode active material layer 142.

Hydrofluoric acid produced in the initial charging step reacts with the trilithium phosphate 146 included in the positive electrode active material layer 142. That is, the trilithium phosphate 146 is dissolved by reacting with hydrofluoric acid. Further, the produced hydrofluoric acid also reacts with the positive electrode active material 170. That is, manganese ions included in the positive electrode active material 170 are eluted therefrom due to the reaction with the hydrofluoric acid.

The manganese ions eluted from the positive electrode active material 170 bind to the dissolved trilithium phosphate 146 and are deposited on the surface of the positive electrode active material 170. As a result, the positive electrode active material film 172 is formed on the surface of the positive electrode active material 170.

The hydrofluoric acid produced in the initial charging step also reacts with the manganese oxide 185 attached to the surface to the conductive additive 180. That is, manganese ions included in the manganese oxide 185, which is attached to the surface of the conductive additive 180, are eluted therefrom due to the reaction with the hydrofluoric acid. The manganese ions eluted from the manganese oxide 185 of the conductive additive 180 bind to the dissolved trilithium phosphate 146 and are deposited on the surface of conductive additive 180. As a result, the conductive additive film 182 is formed on the surface of the conductive additive 180.

That is, in the initial charging step, the positive electrode active material 170 and the conductive additive 180 are changed from the state shown in FIG. 5 to the state shown in FIG. 3. Next, the oxidative decomposition of the solvent component of the electrolytic solution 120 is prevented on the surface of the positive electrode active material 170 on which the positive electrode active material film 172 is formed. In addition, the oxidative decomposition of the solvent component of the electrolytic solution 120 is prevented on the surface of the conductive additive 180 on which the conductive additive film 182 is formed.

In the battery 100 according to the embodiment, the production of hydrofluoric acid is prevented, and thus the deterioration of the battery 100 caused by hydrofluoric acid is prevented. Specifically, in a case where hydrofluoric acid is produced in the battery 100, a transition metal may be eluted from the positive electrode active material 170. In a case where hydrofluoric acid is produced in the battery 100, the binder 145 included in the positive electrode active material layer 142, or the binder 156 included in the negative electrode active material layer 152 may be modified. For example, in a case where the binder 145 is modified and covers the positive electrode active material 170 or the like, the internal resistance of the battery 100 increases. In a case where hydrofluoric acid is produced in the battery 100, the hydrofluoric acid closes the pores of the separators 160, which increases the internal resistance of the battery 100. However, in the battery 100 according to the embodiment, the production of hydrofluoric acid is prevented, and thus the above-described deterioration is prevented.

The present inventors verified that, in a case where the conductive additive base is used as the conductive additive in the positive electrode sheet manufacturing step by using $LiNi_{1/2}Mn_{3/2}O_4$ as the positive electrode active material, the conductive additive film is not formed on the surface of the conductive additive in the initial charging step. That is, in a case where $LiNi_{1/2}Mn_{3/2}O_4$ is used as the positive electrode active material, as described above, manganese ions are eluted from the positive electrode active material in the initial charging step. However, it was verified that the conductive additive film is not formed on the surface of the conductive additive by the manganese ions eluted from the positive electrode active material. That is, it was verified that, in the conductive additive 180 of the battery 100 used in the positive electrode sheet manufacturing step, the conductive additive film 182 is formed on the surface of the conductive additive base 181 by attaching the manganese oxide 185 thereto.

Further, the present inventors analyzed components constituting the positive electrode active material film 172 and components constituting the conductive additive film 182. Specifically, first, the positive electrode sheet 140 was extracted from the battery 100 after the initial charging step, and then the positive electrode sheet 140 was washed with a mixed organic solvent of EC and EMC. As a result, the electrolyte 122 was removed from the positive electrode sheet 140. Next, the positive electrode sheet 140 from which the electrolyte 122 was removed was dipped in a mixed solution of water and acetonitrile such that the positive electrode active material film 172 and the conductive additive film 182 were eluted from the positive electrode active material layer 142. Next, the solution in which the positive electrode active material film 172 and the conductive additive film 182 were eluted underwent an analysis using ion chromatography (IC analysis) and an analysis using inductively coupled plasma (ICP-MS analysis).

Through the IC analysis of the elution in which the positive electrode active material film 172 and the conductive additive film 182 were eluted, fluorine ions (F) and difluorophosphate ions ($PO_2F_2^-$) were able to be quantitatively and qualitatively analyzed. Through the ICP-MS analysis of the solution in which the positive electrode active material film 172 and the conductive additive film 182 were eluted, manganese ions ($Mn^{2+}$) were able to be quantitatively and qualitatively analyzed. Accordingly, it was able to be verified from the results of the analysis that the positive electrode active material film 172 and the conductive additive film 182 include at least fluorine (F), manganese (Mn), and phosphorus (P). It is presumed that positive electrode active material film 172 and the conductive additive film 182 can be represented by $Mn_XPO_5F_Y$ (X and Y represent variables which vary depending on valences of manganese and phosphorus).

The present inventors performed a first experiment and a second experiment described below. In both the first and second experiments, batteries of Examples 1 to 4 according to the disclosure and a battery of a Comparative Example for comparison with Examples 1 to 4 were prepared and used. The Examples were different from the Comparative Example in that manganese oxide was attached to the surface of the conductive additive used in the positive electrode sheet manufacturing step.

That is, in all of Examples 1 to 4, in the conductive additive used in the positive electrode sheet manufacturing step, manganese oxide was attached to the surface of the conductive additive base. That is, in the positive electrode sheet manufacturing step, the conductive additive was prepared according to the conductive additive manufacturing step shown in FIG. 6. That is, all of the batteries according to Examples 1 to 4 were the batteries 100 described above.

On the other hand, in Comparative Example, in the positive electrode sheet manufacturing step, the conductive additive base having a surface to which neither manganese nor manganese oxide were attached was used. Specifically, the conductive additive base used in the positive electrode sheet manufacturing step according to Comparative Example is the same as the conductive additive base which was used in the conductive additive manufacturing step according to Examples before manganese oxide was formed. The battery according to Comparative Example is the same as the battery 100 described above, except for the conductive additive used in the positive electrode sheet manufacturing step.

Table 1 below shows the molar concentrations of the potassium permanganate aqueous solutions used in the conductive additive manufacturing step according to Examples and the composition ratios of manganese to carbon in the conductive additives prepared in the conductive additive manufacturing step. Each of the molar concentrations of the potassium permanganate aqueous solutions shown in Table 1 refers to the total molar concentration of water used in the first dispersion step and the potassium permanganate aqueous solution used in the second dispersion step.

TABLE 1

| | Molar Concentrations of $KMnO_4$ Aqueous Solution [$10^{-3}$ mol/L] | Mn/C Ratio in Conductive Additive (Atomic Ratio) |
| --- | --- | --- |
| Example 1 | 2.5 | 0.05 |
| Example 2 | 5.0 | 0.10 |
| Example 3 | 7.0 | 0.15 |
| Example 4 | 10.0 | 0.20 |
| Comparative Example | $KMnO_4$ was not employed. | |

As shown in Table 1, in Examples 1 to 4, the molar concentrations of the potassium permanganate aqueous solutions used in the conductive additive manufacturing step were different from each other. Specifically, the molar concentration of the potassium permanganate aqueous solution used in the conductive additive manufacturing step increases in order from Example 1 to Example 4. In the conductive additive prepared in the conductive additive manufacturing step, the composition ratio (atomic ratio) of manganese to carbon shown in "Mn/C Ratio" of Table 1 increases in order from Example 1 to Example 4.

In the first experiment, the batteries according to the Examples and Comparative Example prepared under the above-described conditions were repeatedly charged and discharged in a cycle test, and the amounts of gas produced in the cycle test were compared to each other. In the cycle test, the charging and the discharging were alternately performed 200 times at a constant current value of 1 C. In the cycle test, the charge end voltage was set as 4.75 V, and the discharge end voltage was set as 3.5 V. The amount of gas produced in the cycle test was obtained based on the Archimedes principle by measuring the weight of the battery before the cycle test and the weight of the battery after the cycle test in a state of being dipped in the same amount of FLUORINERT (registered trade name), respectively, and obtaining a difference between the weight before the cycle test and the weight after the cycle test.

Figure 7:
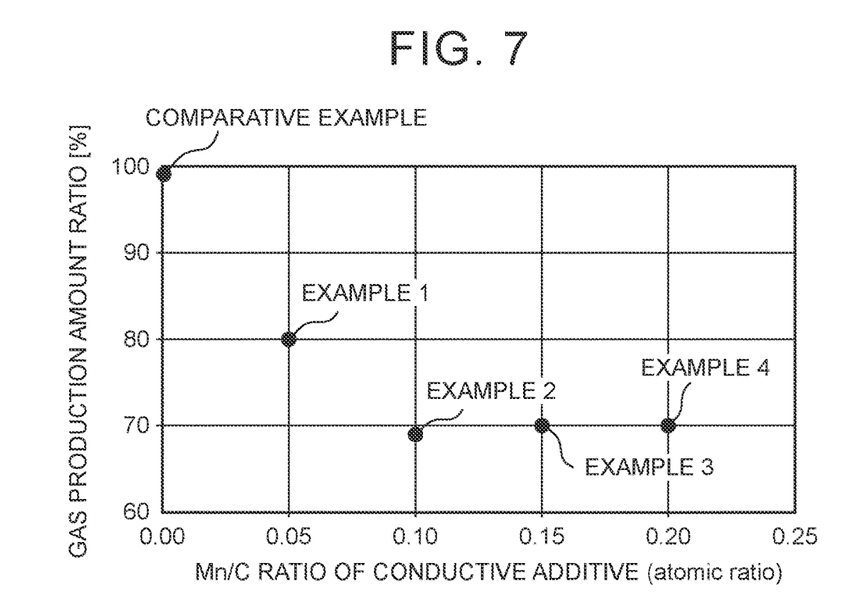
FIG. 7 is a diagram showing gas production amount ratios of batteries according to Examples and Comparative Example.

FIG. 7 shows the gas production amount ratio acquired in each of the batteries according to the Examples and the Comparative Example in the first experiment. The gas production amount ratio refers to the ratio of the amount of gas, which was produced in each of the batteries according to the Examples and the Comparative Example, to the amount of gas produced in the battery according to the Comparative Example. It can be seen from the results of the first experiment shown in FIG. 7 that, in all of Examples 1 to 4, the amount of gas produced was reduced to an amount less than that of the Comparative Example.

In the battery according to the Comparative Example, the positive electrode active material film was formed on the positive electrode active material, but a conductive additive film was not formed on the conductive additive. The reason for this is as follows. In the Comparative Example, in the conductive additive used in the positive electrode sheet manufacturing step, neither manganese nor manganese oxide were attached to the conductive additive base. Accordingly, in the cycle test of the battery according to the Comparative Example, the oxidative decomposition of the electrolytic solution on the surface of the positive electrode active material was able to be prevented, but the oxidative decomposition of the electrolytic solution on the surface of the conductive additive was not able to be prevented. Therefore, it is presumed that, in the battery according to the Comparative Example, the oxidative decomposition of the electrolytic solution in the cycle test was not appropriately prevented and that a large amount of gas was produced due to the oxidative decomposition of the electrolytic solution.

On the other hand, in all the batteries according to Examples 1 to 4, the positive electrode active material film was formed on the positive electrode active material, and the conductive additive film was formed on the conductive additive. The reason for this is as follows. In all of Examples 1 to 4, in the conductive additive used in the positive electrode sheet manufacturing step, manganese oxide was attached to the surface of the conductive additive base. Accordingly, in all the batteries according to Examples 1 to 4, the oxidative decomposition of the electrolytic solution on the surface of the positive electrode active material and the oxidative decomposition of the electrolytic solution on the surface of the conductive additive were appropriately prevented. Therefore, it is presumed that, in all the batteries according to Examples 1 to 4, the amount of gas produced due to the oxidative decomposition of the electrolytic solution in the cycle test was reduced to be less than that of the battery according to the Comparative Example.

It can be seen from the results of Examples 1 to 4 in the first experiment that the oxidative decomposition of the electrolytic solution can be sufficiently prevented by using the conductive additive in which the composition ratio of manganese to carbon is 0.05 or higher in the positive electrode sheet manufacturing step. That is, it can be seen that the conductive additive film formed on the surface of the conductive additive can sufficiently prevent the oxidative decomposition of the electrolytic solution on the surface of the conductive additive.

In the second experiment, the capacity retentions of the respective batteries according to the Examples and the Comparative Example prepared under the above-described conditions were compared to each other. The capacity retention was obtained based on the ratio of the charge capacity after the cycle test to the charge capacity before the cycle test in which the battery was repeatedly charged and discharged. The cycle test of the second experiment was performed under the same conditions as those of the first experiment.

Figure 8:
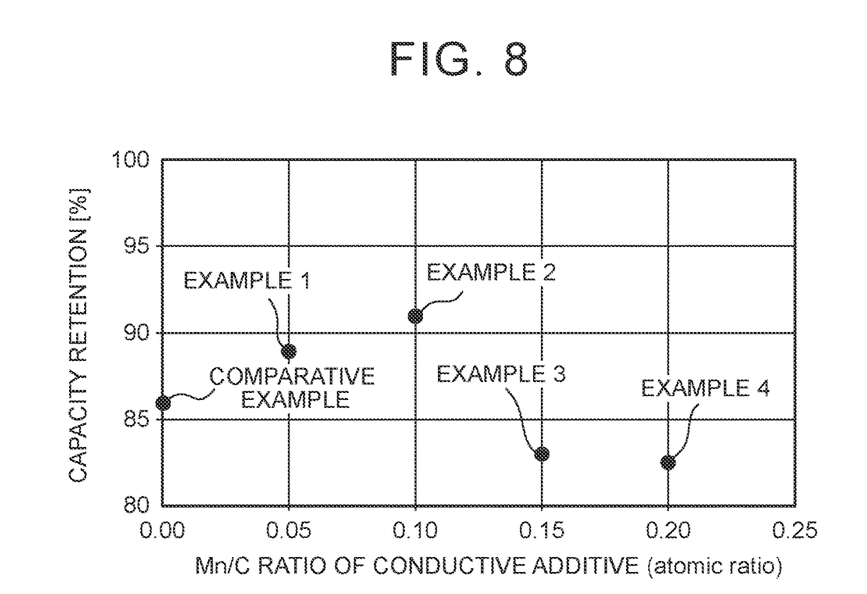
FIG. 8 is a diagram showing capacity retentions of batteries according to Examples and Comparative Example.

FIG. 8 shows the capacity retention acquired in each of the batteries according to Examples and Comparative Example in the second experiment. As shown in FIG. 8, it can be seen that, in Example 3 and Example 4, the capacity retention was lower than that of the Comparative Example. In Examples 3 and 4, as shown in Table 1, the composition ratio of manganese to carbon in the conductive additive used in the positive electrode sheet manufacturing step was high. Therefore, it is presumed that, in Examples 3 and 4, the amount of manganese of the manganese oxide on the surface of the conductive additive was larger than the amount of manganese contributing to the formation of the conductive additive film in the initial charging step.

It is presumed that, in Examples 3 and 4, manganese ions, which did not contribute to the formation of the conductive additive film among the manganese ions eluted from the manganese oxide of the surface of the conductive additive, were deposited on the negative electrode sheet in the cycle test. In a portion of the negative electrode sheet where manganese was deposited, the storage and release of lithium ions during charging and discharging was not able to be smoothly performed. As a result, it is presumed that, in Examples 3 and 4, the charge capacity of the battery decreased in the cycle test.

On the other hand, it can be seen that, in Examples 1 and 2, as shown in FIG. 8, the capacity retention was higher than that of Comparative Example. The reason for this is presumed to be that, in Examples 1 and 2, a difference between the amount of manganese of the manganese oxide on the surface of the conductive additive and the amount of manganese contributing to the formation of the conductive additive film in the initial charging step was small. Therefore, it is presumed that the deposition of manganese on the negative electrode sheet was prevented. As a result, it is presumed that, in Examples 1 and 2, a decrease in the charge capacity of the battery in the cycle test was prevented. Further, as shown in the results of the first experiment, in Examples 1 and 2, the oxidative decomposition of the electrolytic solution was appropriately prevented. It is presumed that, since the oxidative decomposition of the electrolytic solution was prevented, a decrease in the charge capacity of the battery in the cycle test was prevented.

It can be seen from the results of Examples 1 to 4 in the second experiment that a battery having high capacity retention and high durability can be manufactured by using the conductive additive in which the composition ratio of manganese to carbon is 0.10 or lower in the positive electrode sheet manufacturing step.

As described above in detail, the method of manufacturing the nonaqueous electrolyte secondary battery 100 according to the embodiment includes the positive electrode sheet manufacturing step, the accommodation step, and the initial charging step. In the positive electrode sheet manufacturing step, the positive electrode active material 170 is a composite oxide ($LiNi_{1/2}Mn_{3/2}O_4$) including at least lithium and manganese. In addition, in the positive electrode sheet manufacturing step, the conductive additive 180 is obtained by attaching the manganese oxide 185 (manganese dioxide) to the surface of the conductive additive base 181 (carbon material). One of the materials constituting the positive electrode active material layer 142 of the positive electrode sheet 140 is the trilithium phosphate 146. Therefore, in the accommodation step, the trilithium phosphate 146 is accommodated in the battery case 130 together with the positive electrode sheet 140. Accordingly, in the initial charging step, the positive electrode active material film 172 can be formed on the surface of the positive electrode active material 170, and the conductive additive film 182 can be formed on the surface of the conductive additive 180. The positive electrode active material film 172 and the conductive additive film 182 include at least fluorine, manganese, and phosphorus. The positive electrode active material film 172 and the conductive additive film 182 can prevent the oxidative decomposition of the electrolytic solution 120 on the surfaces of the positive electrode active material 170 and the conductive additive 180. That is, a nonaqueous electrolyte secondary battery and a method of manufacturing a nonaqueous electrolyte secondary battery can be realized, in which the oxidative decomposition of a nonaqueous electrolytic solution is prevented.

The above-described embodiment is merely exemplary and does not limit the disclosure. Accordingly, the disclosure can be improved and modified in various ways within a range not departing from the scope of the disclosure. For example, the shape of the wound electrode body 110 is not limited to a flat shape, but a wound electrode body having a cylindrical shape can also be used. In addition, for example, the disclosure can be applied not only a wound electrode body but also a laminate electrode body.

In the above-described embodiment, the conductive additive 180 used in the positive electrode sheet manufacturing step can be manufactured by dispersing the conductive additive base 181 in the potassium permanganate aqueous solution so as to attach the manganese oxide 185 to the conductive additive base 181 in the conductive additive manufacturing step. That is, in the conductive additive manufacturing step according to the above-described embodiment, the manganese oxide is attached to the surface of the carbon material through the deposition caused by the reduction reaction of permanganate in the solution. However, the manganese oxide may be attached to the surface of the carbon material through the deposition caused by the reduction reaction of a manganate, instead of the permanganate, in the solution. As another method of attaching the manganese oxide to the surface of the carbon material, for example, powder sputtering can be adopted in which manganese oxide is used as a target and in which a carbon material is used as a substrate. As still another method of attaching manganese oxide to the surface of the carbon material, a mechanochemical method can be adopted.

In the above-described embodiment, the example in which the manganese oxide 185, which is attached to the surface of the conductive additive 180 used in the positive electrode sheet manufacturing step, is manganese dioxide ($MnO_2$) has been described in detail. However, the manganese oxide, which is attached to the surface of the conductive additive used in the positive electrode sheet manufacturing step, may be $Mn_2O_3$ or $Mn_3O_4$ instead of $MnO_2$. In the conductive additive used in the positive electrode sheet manufacturing step, manganese (Mn) may be attached to the surface of the carbon material. That is, the conductive additive used in the positive electrode sheet manufacturing step may be obtained by attaching at least one of manganese or manganese oxide to a surface of a carbon material.

In the above-described embodiment, one of the materials constituting the positive electrode active material layer 142 of the positive electrode sheet 140 is the trilithium phosphate 146. As a result, in the accommodation step, the trilithium phosphate 146 is accommodated in the battery case 130 together with the positive electrode sheet 140. However, for example, the trilithium phosphate may be accommodated in the battery case together with the electrolytic solution. That is, by using a solution in which trilithium phosphate is dissolved as the electrolytic solution, in the accommodation step, the trilithium phosphate may be accommodated in the battery case together with the electrolytic solution. Even in a case where a solution in which trilithium phosphate is dissolved is used as the electrolytic solution, as in the above-described embodiment, in the initial charging step, the positive electrode active material film can be formed on the surface of the positive electrode active material, and the conductive additive film can be formed on the surface of the conductive additive.

What is claimed is:

1. A nonaqueous electrolyte secondary battery, comprising:
   a positive electrode sheet;
   a negative electrode sheet;
   a nonaqueous electrolytic solution that includes an ionic compound including fluorine; and
   a battery case that accommodates the positive electrode sheet, the negative electrode sheet, and the nonaqueous electrolytic solution, wherein
   the positive electrode sheet includes a positive electrode current collector foil and a positive electrode active material layer that includes a positive electrode active material and a conductive additive,
   the positive electrode active material has a composite oxide and a first film on a surface of the composite oxide including lithium and manganese,
   the conductive additive has a carbon material and a second film on a surface of the carbon material, and
   the first film and the second film each include fluorine, manganese, and phosphorus.

2. The nonaqueous electrolyte secondary battery according to claim 1, wherein
   the first film and the second film comprise $Mn_XPO_5F_Y$, and
   X and Y are variables which vary depending on valences of manganese and phosphorus.

3. A method of manufacturing a nonaqueous electrolyte secondary battery,
   the nonaqueous electrolyte secondary battery including a positive electrode sheet, a negative electrode sheet, a nonaqueous electrolytic solution that includes an ionic compound including fluorine, and a battery case that accommodates the positive electrode sheet, the negative electrode sheet, and the nonaqueous electrolytic solution,
   the method comprising:
   manufacturing the positive electrode sheet by forming a positive electrode active material layer, which includes a positive electrode active material and a conductive additive, on a surface of a positive electrode current collector foil;
   accommodating the positive electrode sheet, the negative electrode sheet, the nonaqueous electrolytic solution, and trilithium phosphate in the battery case to form a pre-charged battery; and
   charging the pre-charged battery after the positive electrode sheet, the negative electrode sheet, the nonaqueous electrolytic solution, and the trilithium phosphate are accommodated, wherein
   in the manufacturing of the positive electrode sheet, the positive electrode active material is a composite oxide including lithium and manganese, and the conductive additive is obtained by attaching at least one of manganese and manganese oxide to a surface of a carbon material,
   the method further comprising:
   manufacturing the conductive additive, before the positive electrode sheet is manufactured, by preparing a mixture of the carbon material, one of a permanganate and a manganate, and water and reducing one of the permanganate and the manganate so as to attach the manganese oxide to the carbon material, wherein,
   charging the pre-charged battery forms a film derived from the trilithium phosphate on the surface of the positive electrode active material.

4. The method according to claim 3, wherein
   an atomic ratio of manganese to carbon in the conductive additive is 0.05 or higher.

5. The method according to claim 3, wherein
   an atomic ratio of manganese to carbon in the conductive additive is 0.10 or lower.

6. The nonaqueous electrolyte secondary battery according to claim 1, wherein
   the ionic compound including fluorine is selected from the group consisting of $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$.

7. The nonaqueous electrolyte secondary battery according to claim 1, wherein
the positive electrode active material layer further comprises a binder.

8. The nonaqueous electrolyte secondary battery according to claim 7, wherein
the binder is polyvinylidene fluoride.

9. The nonaqueous electrolyte secondary battery according to claim 1, wherein
the composite oxide of the positive electrode active material comprises a compound obtained by substituting a part of manganese (Mn) in lithium manganese oxide (LiMn$_2$O$_4$) having a spinel crystal structure with a transition metal.

10. The nonaqueous electrolyte secondary battery according to claim 1, wherein
the composite oxide of the positive electrode active material is LiNi$_{1/2}$Mn$_{3/2}$O$_4$.

11. The nonaqueous electrolyte secondary battery according to claim 1, wherein
the carbon material of the conductive additive is a carbon black selected from the group consisting of acetylene black (AB), ketjen black, furnace black, and channel black.

12. The nonaqueous electrolyte secondary battery according to claim 1, further comprising a separator between the positive electrode sheet and the negative electrode sheet.

13. The nonaqueous electrolyte secondary battery according to claim 1, wherein
the negative electrode sheet includes a negative electrode current collector foil and a negative electrode active material layer that includes a negative electrode active material and a binder.

14. The method according to claim 3, wherein
the carbon material of the conductive additive is a carbon black selected from the group consisting of acetylene black (AB), ketjen black, furnace black, and channel black.

15. The method according to claim 3, wherein
the composite oxide of the positive electrode active material is LiNi$_{1/2}$Mn$_{3/2}$O$_4$.

16. The method according to claim 3, wherein
the manganese oxide attached to the carbon material of the conductive additive is selected from the group consisting of manganese(IV) oxide (MnO$_2$), manganese(III) oxide (Mn$_2$O$_3$), and manganese(II,III) oxide (Mn$_3$O$_4$).

17. The method according to claim 3, wherein
the one of a permanganate and a manganate is a permanganate and is potassium permanganate (KMnO$_4$).

18. The method according to claim 3, wherein
an atomic ratio of manganese to carbon in the conductive additive is from 0.05 to 0.10.

19. The method according to claim 16, wherein
an atomic ratio of manganese to carbon in the conductive additive is from 0.05 to 0.10.

* * * * *